United States Patent

Enarsson et al.

[15] 3,688,563
[45] Sept. 5, 1972

[54] DEVICE FOR MEASURING THE BEATING DEGREE OF PULP FLOWING THROUGH A CONDUIT

[72] Inventors: Knut Enarsson, Saffle; Henrik M. Kitsnik, Segmon, Sweden

[73] Assignee: Aktiebolaget Kalle-Regulatorer, Saffle, Sweden

[22] Filed: May 4, 1971

[21] Appl. No.: 140,080

[30] Foreign Application Priority Data

June 17, 1970 Sweden..........................8422

[52] U.S. Cl......................................73/63, 162/263
[51] Int. Cl..............................................G01n 15/00
[58] Field of Search..........73/63, 61 R; 162/263, 198

[56] References Cited

FOREIGN PATENTS OR APPLICATIONS

1,043,669  11/1958  Germany......................73/63

*Primary Examiner*—Louis R. Prince
*Assistant Examiner*—Joseph W. Roskos
*Attorney*—Nolte & Nolte

[57] ABSTRACT

The beating degree of pulp flowing through a conduit is determined by a cylinder connected to the conduit and containing a movable piston partly formed as a strainer. The inner end of the cylinder can be closed by a cover when a sample has been withdrawn, and pressure fluid can be supplied to the cylinder to cause a dewatering of the sample through the strainer.

4 Claims, 3 Drawing Figures

DEVICE FOR MEASURING THE BEATING DEGREE OF PULP FLOWING THROUGH A CONDUIT

BACKGROUND OF THE INVENTION

In the laboratory the beating degree of cellulose pulp and also mechanical pulp may be determined by means of a Schopper-Riegler or Freeness apparatus which measures the volume of water removed from a sample of pulp by straining during a fixed time. In many cases, however, it is desired to determine the beating degree of a fibrous suspension flowing through a conduit, and various apparatuses operating more or less continuously have also been constructed for this purpose. However, these known apparatuses are difficult to handle and/or give not very accurate results.

SUMMARY OF THE INVENTION

The object of the invention is to provide an apparatus which may be connected to a conduit for flowing pulp to render possible a periodical withdrawal of samples of pulp and an accurate determination of their beating degree. If desired, the result of the measuring may be obtained in °SR. The apparatus comprises a vertical sampling cylinder closed at its bottom but open at the top. The upper end of the cylinder is connected to a corresponding opening in the lower wall of a substantially horizontal portion of said conduit. A cover plate mounted within the conduit above the cylinder is adapted to be moved to and from a position in which the open cylinder end is kept closed. A piston movable in the cylinder is composed of a strainer disk and a solid disk normally covering the bottom side of the strainer disk but movable therefrom to form a space below the strainer, when the latter reaches its lowest position. A tapping pipe provided with a valve extends from said space to a measuring vessel and, further, a valve controlled pressure fluid conduit is connected to the upper end of the cylinder whereby a sample of pulp filling the cylinder may be dewatered at overpressure, when the upper cylinder end has been closed by the cover plate. The water removed from the sample of pulp is then collected in the measuring vessel, and its amount may be used as a measure on the beating degree of the pulp.

Irrespective of the choice of pressure fluid (gas or liquid) it is of essential importance for a reliable result that the dewatering of the sample of pulp through the strainer plate occurs at a constant pressure. If a liquid pressure fluid is preferred, only water under pressure is useful in practice, and in such case it has proved to be of less importance if some of the pressurized water supplied from above in the sampling cylinder mixes with the upper layer of the sample. The explanation thereof may be that a filtering fiber cake is rapidly formed on the strainer plate already at the beginning of the straining operation, and the permeability of said fiber cake for water is then practically independent of the dilution of the filtered suspension. Thus, in this case the ability of the pulp sample to permit the passage of water is measured.

DETAILED DESCRIPTION OF THE PREFERRED EMBODIMENT

Figure 1:
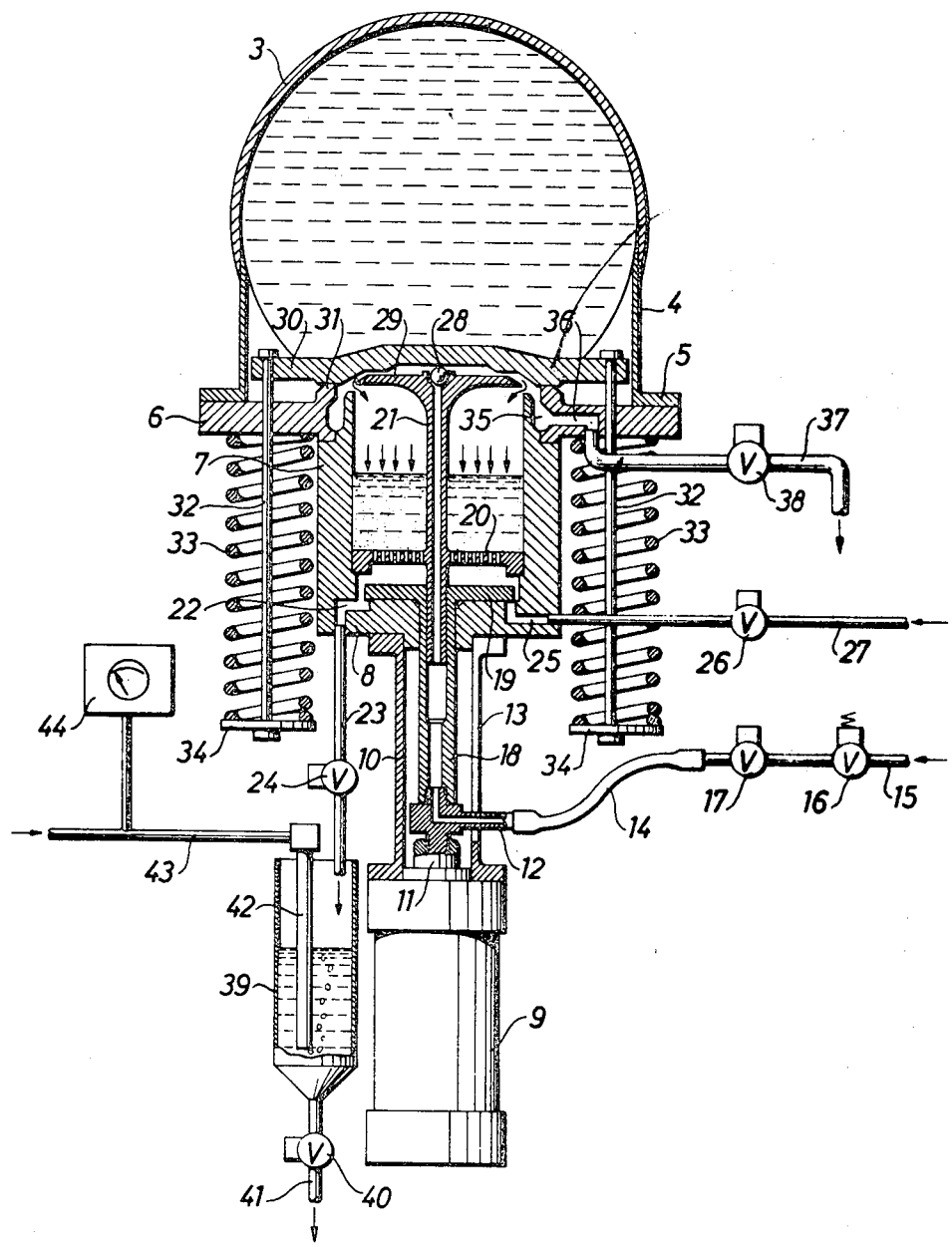
Figure 2:
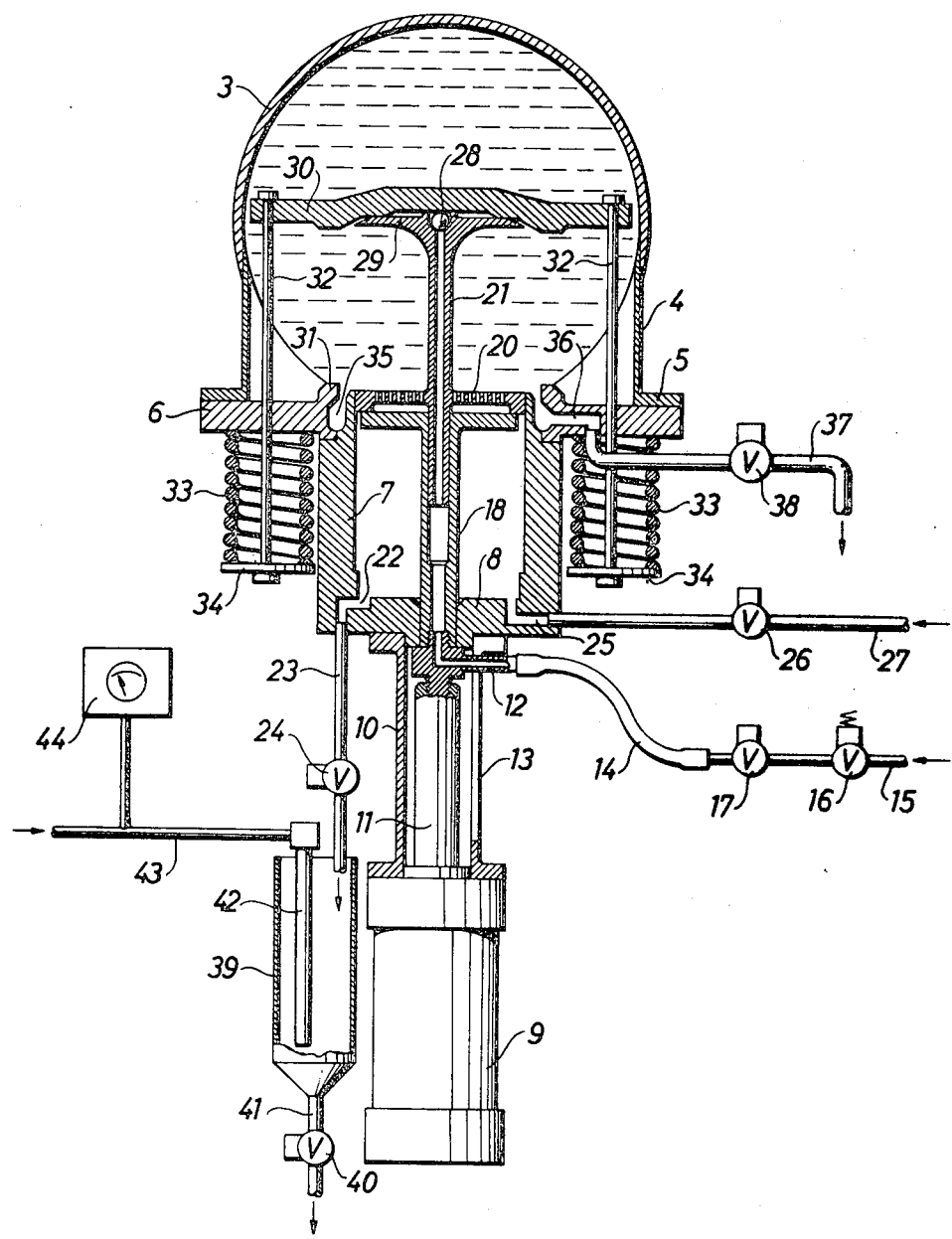

The invention will be described in more detail with reference to the accompanying drawings, in which FIGS. 1 and 2 diagrammatically show an embodiment of the apparatus in two different working positions, in both cases in vertical section.

Figure 3:
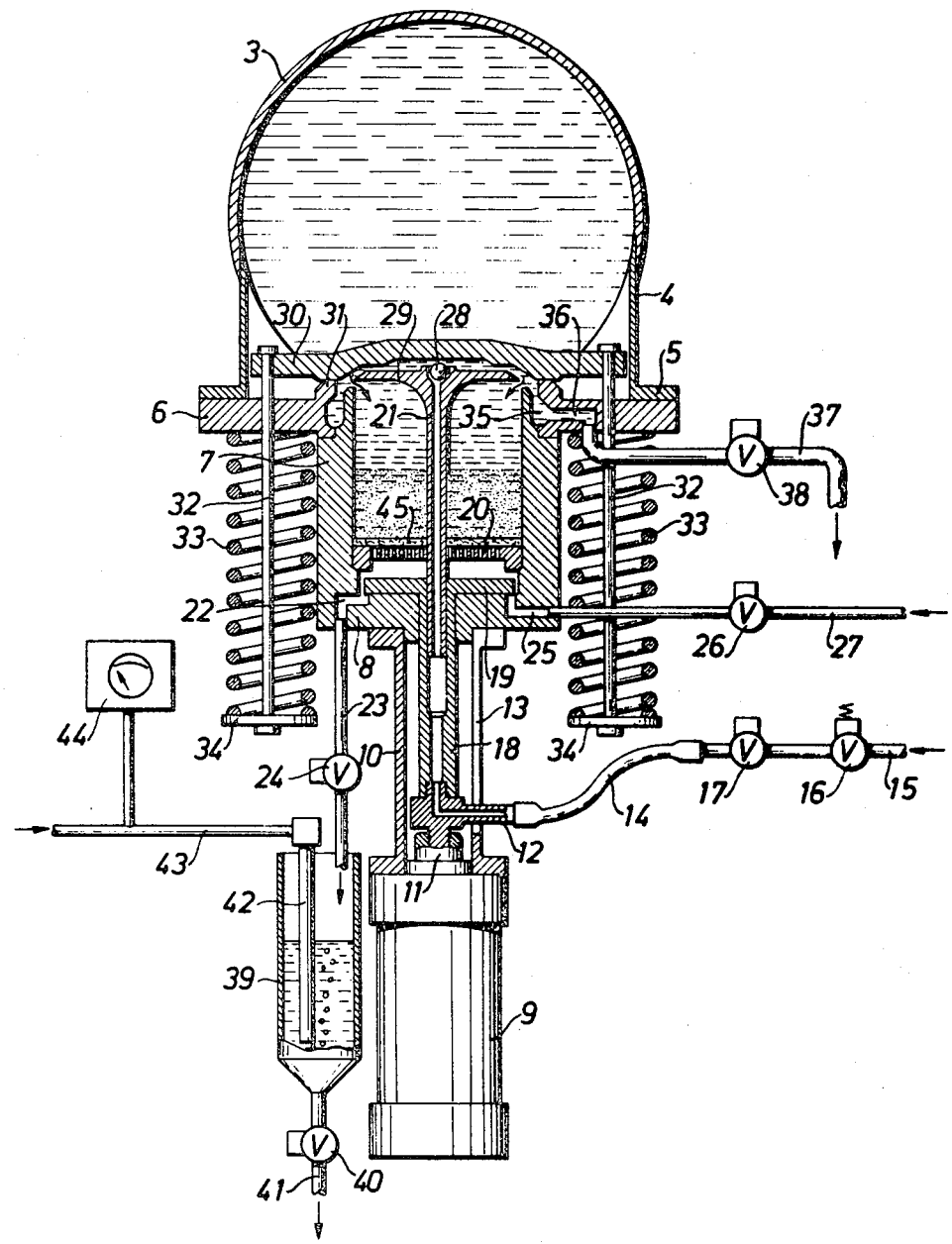

FIG. 3 shows the apparatus in the same working position as in FIG. 1 but in the case when water is used as pressure fluid.

A horizontal conduit 3 for a fibrous suspension has a branch consisting of a short pipe socket 4 welded to its lower side. The free end of the pipe socket 4 has a radial flange 5 to which a ring 6 with a smaller inner diameter than the pipe 4 is secured in a way not shown. The ring 6 carries a depending cylinder 7 (hereinafter called sampling cylinder) releasably mounted thereon. The cylinder 7 has a bottom wall 8 but is open at its upper end to communicate with the interior of the conduit 3.

A pressure fluid operated double-acting cylinder 9 is carried coaxially in alignment to the sampling cylinder 7 by means of a tubular connection member 10 suspended from the bottom wall 8 of the cylinder 7. The tube 10 encloses with clearance a piston rod 11 extending upwards from a piston within the driving cylinder 9. The outer end of the piston rod 11 is secured to a right-angled pipe 12, one end of which projects radially through a longitudinal slit 13 in the connection member 10. By means of a flexible hose 14 the pipe 12 is connected to a pressure air conduit 15 containing a reduction valve 16 and a shut-off valve 17. The other end of the pipe 12 is threaded externally and screwed into one end of a tubular piston rod extension 18 which is sealingly fitted through a central opening in the bottom wall 8 of the sampling cylinder 7. Within the sampling cylinder 7 the end of the tube 18 carries a flange or plate 19, the diameter of which is slightly smaller than the smallest inner diameter of the sampling cylinder 7.

A piston 20 within the sampling cylinder 7 is formed as a strainer plate and has a tubular piston rod 21, the lower end of which is slidably fitted in the upper part of the tubular extension 18. In FIG. 1, the strainer plate 20 is in its lower end position in which it rests on an annular shoulder in the cylinder 7 at such a distance from the bottom wall 8 that a space is formed between the underside of the strainer plate and the upper side of the plate 19, when the latter is in contact with the bottom wall 8. A channel 22 through the bottom wall 8 connects said space with an outlet pipe 23 directed downwardly and containing a shut-off valve 24. Another channel 25 extending through the lower end of the sampling cylinder 7 is connected to a thrust water pipe 27 provided with a shut-off valve 26.

The tubular piston rod 21 extends upwards through the sampling cylinder 7, and its upper end contains a check valve 28 (ball valve) opening outwardly. In case a liquid is used as pressure fluid the check valve 28 may be omitted. Further, the upper end of the rod 21 is widened radially to form a disk-like member 29. In its lower end position shown in FIG. 1, said disk 29 is located slightly above the open upper end of the cylinder 7 so that an annular space is formed.

A horizontal plate 30 is movable with clearance within the pipe socket 4. In FIG. 1, the plate 30 is supported by an annular bead 31 provided around the inner periphery of the ring 6, whereby said plate forms a sealing cover for the sampling cylinder 7. Two vertical guide rods 32 are secured to diametrically opposed points of the plate 30 and extend through corresponding bores in the ring 6. The rods 32 are actuated in direction downwards by surrounding helical springs 33 which are disposed between the underside of the ring 6 and washers 34 mounted on the ends of the rods 32. By this arrangement, the cover 30 is normally held in sealing engagement with the annular bead 31, and in this position the upper side of the disk 29 is positioned slightly spaced from the underside of the cover 30. The arrangement is such that a central space is left around the check valve 28 even if the disk 29 is moved upwards so that its rim portion engages the underside of the cover 30, as shown in FIG. 2.

An annular chute 35 is formed between the inner circumference of the ring 6 and an opposite portion of the outside of the cylinder 7, and a channel 36 extending radially from said chute 35 through the ring 6 is connected to a discharge conduit 37 containing a shut-off valve 38.

The outlet pipe 32 from the lower end of the sampling cylinder 7 ends into a cylindrical measuring vessel 39 open at the top. A bottom outlet 41 from said vessel 39 is provided with a shut-off valve 40. The measuring vessel may be graduated to indicate the amount of liquid collected, but preferably the liquid level is measured in another way known per se. Thus, a vertical tube 42 dipping into the vessel 39 with its lower end is connected to a conduit 43 through which a weak flow of air is supplied. The pressure variations in the conduit 43 caused by varying liquid levels in the vessel 39 are indicated by a pressure meter 44 connected to the conduit and, if desired, graduated to indicate °SR.

The beating degree meter described above operates as follows. Initially, the various movable parts are in the positions shown in FIG. 1 except that the sampling cylinder 7 and the measuring vessel 39 are empty. The draining valve 24 and the bottom valve 40 of the measuring vessel are open in this initial position, but the valves 17,26,38 in the conduits 15, 27 and 37, respectively, are closed. The pressure reduction valve 16 in the compressed air conduit 15 has been adjusted at a comparatively low constant overpressure which may vary between 0.4 and 0.8 atm. gauge, for instance. Further, the piston of the cylinder 9 is in its lower position.

In preparation for a testing operation, pressure fluid is supplied to the cylinder 9 so that its piston rod 11 moves upwards. Hereby the cover plate 19 engages the underside of the strainer plate 20 in the sampling cylinder 7, and the two plates 19,20 form a solid piston which continues the upward movement as a unit. During this continued movement the disk 29 engages the cover 30 and lifts it against the action of the springs 33 into the upper position shown in FIG. 2, where the piston 19,20 is positioned at the upper end of the sampling cylinder 7. In this position the flow of pulp through the conduit 3 passes freely between the upper side of said piston and the underside of the cover 30. When a sample of pulp is to be withdrawn for determination of the beating degree, the compressed air valve 17 is first opened so that compressed air enters the closed space between the disk 29 and the cover 30 through the hose 14, the tubular piston rods 18,21 and the check valve 28. Thereupon the supply of pressure fluid to the cylinder 9 is changed so that the piston rod 11,18 with the cover plate 19 moves downward. Then the other movable parts also move downwards because of the force exercised by the springs 33 on the cover 30. When the cover 30 has resumed the closing position shown in FIG. 1, a volume of pulp to be tested has been enclosed in the cylinder 7 between the piston 19,20 and the cover 30. Owing to the overpressure prevailing in the space outside the check valve 28, the disk 29 and the strainer plate 20 are moved still further downwards, and thus the compressed air supplied by the conduit 15 flows into the cylinder 7 and acts upon the upper surface of the pulp column located therein. The strainer plate 20 is stopped in its lower end position described above, while the piston rod 11,18 moves the plate 19 into contact with the bottom of the cylinder 7. When a space has thus been established below the strainer plate 20, water begins to escape from the pulp in the cylinder 7 under the influence of the compressed air, and the water flows through the pipe 23 down into the measuring vessel 39, the bottom valve 40 of which is now closed. FIG. 1 shows a stage during the draining when the pulp column in the sampling cylinder 7 has sunk to approximately half its initial height, at the same time as a quantity of water has been collected in the measuring vessel 39. At a determined point of time after the closing of the valve 40, the draining valve 24 is closed and now the vessel 39 contains the amount of water that has been drained off under the influence of a determined fall of pressure during the period of time in question. As mentioned, the cooperating factors, compressed air, time of draining etc., may be determined such that the result is obtained in °SR on the pressure meter 44.

When the draining valve 24 and the compressed air valve 17 have been closed, the valve 26 in the thrust water conduit 27 and the valve 38 in the outlet conduit are opened to remove the pulp tested. Although not shown in the drawing, a pressure air conduit controlled by a valve may open into the water conduit 27 so that the washing water is mixed with air bubbles before reaching the underside of the strainer plate. Such a mixture of water and air has proved to effect a particularly efficient cleansing of the strainer. After washing for a determined period of time the valves 26,28 are closed and the valves 24 and 40 are reopened, so that the sampling cylinder and the measuring vessel are emptied and the apparatus is again in its initial position before the next testing operation.

If desired, the various valves of the device except the pressure reduction valve 16 may be controlled by a programming mechanism which initiates the desired operations at determined moments.

As mentioned above, the sampling cylinder 7 may be releasably mounted in the ring 6, although the arrangement therefor is not shown. Such a mounting has the advantage that the entire apparatus can be removed for maintenance or repair without disturbing the normal operation of the plant, as the opening in the ring 6 is kept closed by the cover plate 30.

In the case that the apparatus is to be operated with power water instead of pressure air, the cylinder 7 is initially filled with rinsing water, while the movable parts are in the position shown in FIG. 3. In this initial position the valves 17,26,38 are open and the valves 24,40 are closed. Also here the reduction valve 16 is adjusted on a desired overpressure.

When a testing operation is to be carried out, the driving cylinder 9 is caused to move the piston 11 upwards, the valves 26, 38 are closed, and the dewatering valves 24, 40 are opened so that the cylinder 7 and the vessel 39 are emptied. When a sample of pulp has been withdrawn from the conduit 3, and the strainer disk 20 has reached the position in FIG. 3, as described in connection with the previous embodiment, the pressure is increased in the cylinder 7 by supply of pressure water from the channel 21 so that water escapes through the strainer 20. Rather soon the dewatering of the pulp results in the formation of a fiber cake 45 settled on the strainer 20. After a predetermined period of time the valve 40 is closed, so that the water is collected in the measuring vessel 39, and after a further predetermined time the valve 24 is closed, whereupon the amount of water in the vessel 39 is measured.

What we claim is:

1. Apparatus for measuring the beating degree of pulp flowing through a conduit, comprising a vertical sampling cylinder closed at its bottom but open at the top, the upper end of the cylinder being connected to a corresponding opening in the lower wall of a substantially horizontal portion of said conduit, a cover plate mounted within the conduit above the cylinder and adapted to be moved to and from a position in which the open cylinder end is kept closed, a piston movable in the cylinder, said piston being composed of a strainer disk and a solid disk normally covering the bottom side of the strainer disk but movable therefrom to form a space below the strainer, when the latter reaches its lowest position, a tapping pipe extending from said space to a measuring vessel, a valve in said pipe, and a valve controlled pressure fluid conduit connected to the upper end of the cylinder, whereby a sample of pulp filling the cylinder may be dewatered at overpressure, when the upper cylinder end has been closed by the cover plate.

2. Apparatus as claimed in claim 1, in which the strainer disk is secured to a tubular piston rod extending through the sampling cylinder, in which the solid piston disk is secured to the upper end of a second tube slidably inserted through an opening in the bottom wall of the cylinder, in which the lower end of the second tube is connected to a valve controlled conduit for supply of pressure fluid, and in which the lower end of the tubular piston rod is slidably connected to the upper end of said second tube so as to form a channel for the pressure fluid to the top of the cylinder.

3. Apparatus as claimed in claim 1, in which a valve controlled conduit for supply of rinsing water is connected to the lower end of the sampling cylinder, an outlet controlled by a valve being provided at the upper end of said cylinder.

4. Apparatus as claimed in claim 1, in which springs are provided to force the cover plate on to the upper end of the sampling cylinder.

* * * * *